(12) United States Patent
Kesling et al.

(10) Patent No.: US 9,172,428 B2
(45) Date of Patent: Oct. 27, 2015

(54) DETERMINING THE SPECTRAL ENERGY CONTENT OF A DATA BUS

(71) Applicant: Intel Corporation, Santa Clara, CA (US)

(72) Inventors: Dawson Kesling, Davis, CA (US); Adam Norman, Forest Grove, OR (US); Alberto Alcocer Ochoa, Zapopan (MX); Eduardo Alban, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/931,721

(22) Filed: Jun. 28, 2013

(65) Prior Publication Data

US 2015/0003506 A1    Jan. 1, 2015

(51) Int. Cl.
*H04B 3/00* (2006.01)
*H04B 3/46* (2015.01)
*H04L 12/26* (2006.01)

(52) U.S. Cl.
CPC . *H04B 3/46* (2013.01); *H04L 12/26* (2013.01)

(58) Field of Classification Search
CPC ......... H04L 5/06; H04L 7/0008; H04L 7/033; H04L 7/0338; H03L 7/00; H03L 7/085
USPC ......... 375/219, 226, 285, 229, 232, 296, 346, 375/350, 371; 327/141, 154, 384; 370/516, 370/518
See application file for complete search history.

(56) References Cited

U.S. PATENT DOCUMENTS

| | | | |
|---|---|---|---|
| 6,794,920 B1* | 9/2004 | Aliahmad et al. | 327/307 |
| 7,069,458 B1* | 6/2006 | Sardi et al. | 713/401 |
| 8,498,344 B2* | 7/2013 | Wilson et al. | 375/257 |
| 2003/0223487 A1* | 12/2003 | Fisher | 375/226 |
| 2004/0114637 A1* | 6/2004 | Jiang | 370/537 |
| 2006/0125665 A1* | 6/2006 | Lin | 341/100 |
| 2013/0181757 A1* | 7/2013 | Calabro et al. | 327/159 |
| 2014/0185658 A1* | 7/2014 | Sindalovsky et al. | 375/222 |

* cited by examiner

*Primary Examiner* — Khanh C Tran
(74) *Attorney, Agent, or Firm* — International IP Law Group, P.L.L.C.

(57) ABSTRACT

Techniques for determining the spectral content of a data bus are described herein. An example of a device in accordance with the present techniques includes a data bus comprising one or more signal lines, a first phasor generator, and a second phasor generator. The first phasor generator obtains a first data value based on the data to be transmitted over the data bus and generates a first phasor. The second phasor generator obtains a second data value based on the data to be transmitted over the data bus and generates a second phasor. The sum of the first phasor and the second phasor indicate, at least in part, the spectral content of the data to be transmitted over the data bus.

30 Claims, 12 Drawing Sheets

800

1200

DETERMINING THE SPECTRAL ENERGY CONTENT OF A DATA BUS

TECHNICAL FIELD

This disclosure relates generally to techniques for determining the spectral energy content of a data bus. More specifically, the disclosure describes phasor techniques for determining the spectral energy content of a data bus.

BACKGROUND

Data busses in a computing platform generally produce electromagnetic radiation that can be a main source of radio frequency interference (RFI) with wireless radio reception in mobile computing platforms such as tablets, smartphones, and portable personal computers. For example, a portable computing platform may have at least three radio antennas, with one or more in its base. In addition, such platforms typically support five or more radio bands, e.g., Wi-Fi (802.11a/b/g/n), Bluetooth technology, and various different cellular standards such as LTE and WiMax, among others.

One RFI mitigation approach uses an active data coding technique referred to as spectral line coding, which mitigates bus noise generated at desired frequency bands by modifying the binary signal data before it is transmitted on the bus. Another RFI mitigation approach, referred to as assisted baseband cancellation, mitigates bus noise by introducing a signal at the radio receiver baseband level that is intended to cancel the noise generated by the bus. Both techniques rely on being able to accurately determine the magnitude and phase of the RFI caused by the digital signals at one or more frequencies.

DETAILED DESCRIPTION

The subject matter disclosed herein relates to techniques for determining the spectral energy content of the digital signals present on a data bus. As used herein, the term "spectral energy content" or simply "spectral content" is used to refer to the magnitude and phase of the RFI generated by the data transmitted on a bus. The spectral content can be determined at one or more frequencies or ranges of frequencies. As explained above, this information can be used to implement various RFI mitigation techniques, such as spectral line coding and assisted baseband cancellation, among others.

In most modern electronics, the frequency domain information for non-repetitive time domain signals is normally found using a Fourier transform such as the fast Fourier transform (FFT), which is a variation of the discrete Fourier transform (DFT). The FFT is computationally efficient. However, the digital signals that are being analyzed are treated as continuous time signals that are low pass filtered, sampled at a relatively high rate, and converted from analog to digital form. Additionally, the sampled digital values are stored in hardware for efficient FFT processing. Thus, the FFT uses a relatively high level of processing resources.

A computationally simpler technique is the phasor technique, which can be implemented with a sampling rate equal to the bus clock frequency and uses less buffer memory. The phasor technique uses fewer processing resources compared to the FFT. However, the basic phasor technique tends to be inaccurate at high frequencies for various reasons that will be explained further below. The present disclosure describes techniques that can be used to improve the accuracy of the phasor technique for higher frequencies and to the less ideal conditions of some electronic data buses.

Figure 1:
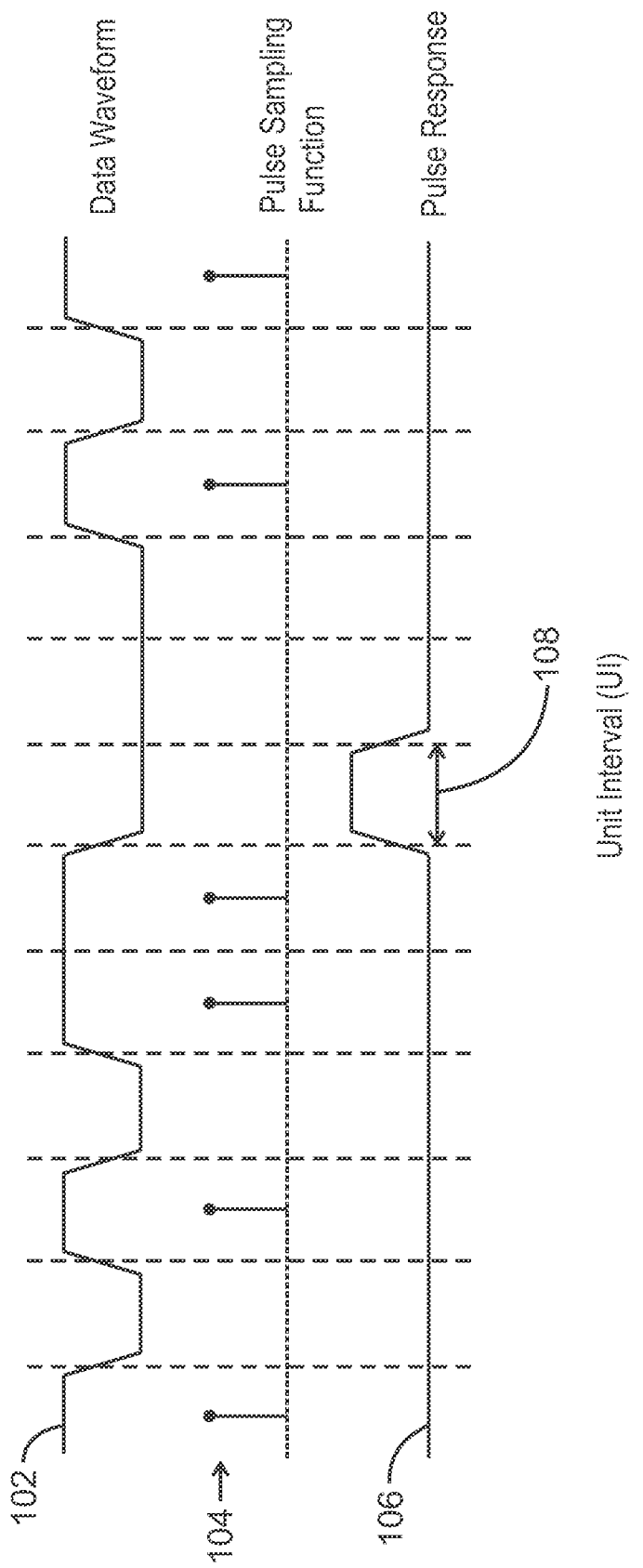
FIG. 1 is a timing diagram used to illustrate the basic phasor technique.

FIG. 1 is a timing diagram used to illustrate the basic phasor technique. The timing diagram 100 includes a data waveform 102, a pulse sampling function 104, and a pulse response 106. The data waveform 102 represents a hypothetical digital signal that can be transmitted on a data bus. The pulse sampling function 104 represents the underlying digital data or bits that are conveyed by the data waveform 102. The unit interval (UI) 108 represents the time period allocated to a single bit of the data waveform 102 on the bus. The pulse response 106 is the electrical response of the bus during a single unit interval 108 due to a particular bit level setting, in this example, a bit level of one.

The data waveform 102 can be approximated by the convolution of the pulse response 106 with the pulse sampling function 104. The pulse sampling function 104 carries the digital data information while the pulse response 106 carries additional information about the signal waveform. A trapezoidal pulse response is shown in FIG. 1 for illustration simplicity. However, it will be appreciated that the pulse response shown in FIG. 1 is somewhat idealized and that the actual pulse response may vary from what is shown in FIG. 1. The basic phasor technique operates by determining the spectral content of the digital data based only on the pulse sampling function 104. Since convolution in the time domain is equivalent to multiplication in the frequency domain, the effect of the pulse response 106 on the spectral components of the signal can be ignored for applications that only compare spectra arising from different digital data, such as spectral line coding and assisted baseband cancellation. The phasor technique can be used to determine the relative spectral energy of the data waveform 102 from the underlying digital data. The basic phasor calculation can be described by Equation 1 below.

$$Y(f) = \sum_{n=1}^{N} y_n e^{-i2\pi f \cdot n T_{UI}} \quad \text{(Eq. 1)}$$

In Equation 1, Y(f) is the net phasor at frequency f, y is the digital data (which may be the sum of data for a group of signals which are physically close relative to the wavelength corresponding to f), n is the unit interval index, and $T_{UI}$ is the unit interval time (also known as the bit time, symbol period, or baud period). The term inside the summation is the phasor for a single unit interval. The net phasor is the sum of all UI phasors in the desired interval. The net phasor, Y(f), represents the spectral content of the digital waveform at a specified frequency. The process described above may be repeated to obtain the net phasor for more than one frequency.

Figure 2:
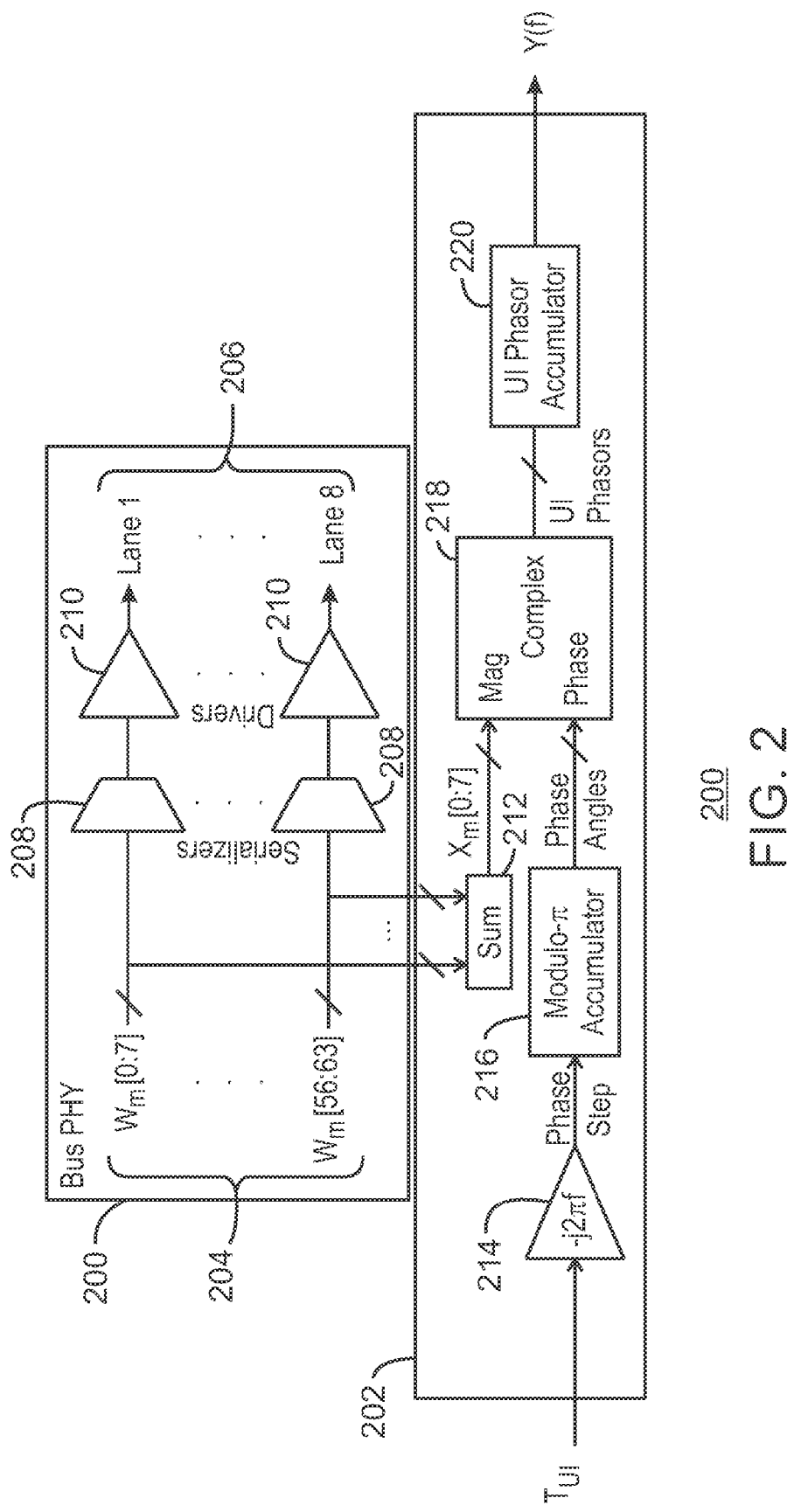
FIG. 2 is a block diagram of an example of device that can be used to determine the spectral content of a data bus.

FIG. 2 is a block diagram of an example of device that can be used to determine the spectral content of a data bus. FIG. 2 shows a physical layer (PHY) of a data bus, referred to herein as the bus PHY 200, and a phasor generator 202 coupled to the bus PHY 200. The example bus PHY 200 of FIG. 2 includes sixty-four internal bus lanes 204, which are serialized into eight external bus lanes 206 by serializers 208. Each serializer 208 receives eight parallel bits and outputs the eight bits in series.

The driver 210 receives the serialized data from the serializers 208 and generates the signal transmitted over the external bus lanes 206. In the example, bus PHY 200 of FIG. 2, the external bus lanes 206 operate with a bus rate that is eight times faster than the bus rate of the internal bus lanes 204. The bus PHY 200 may be any suitable type of bus including a Universal Serial Bus (USB), Peripheral Component Interconnect (PCI), PCIe (PCI express), or a DRAM memory bus, among others. It will be appreciated that the bus configuration shown in FIG. 2 is just one example of a bus that can be used in accordance with embodiments of the present techniques. For example, the bus PHY 200 can include any suitable number of internal bus lanes 204 or external bus lanes 204. The bus PHY 200 can be an used to communicate between internal components of a computing device. Additionally, the bus PHY 200 can be coupled to a port used for external communication between computing devices, for example, through a cable connector. Furthermore, the bus PHY 200 can be included in any type of computing device, including laptop computers, smart phones, tablet PCs, desktop computers, and server computers, among others.

In the embodiment shown in FIG. 2, the phasor generator 202 processes the bus data on the internal bus lanes 204 at the slower internal bus rate. In some embodiments, the phasor generator 202 may be coupled to the external bus lanes 206 rather than the internal bus lanes 204. The eight external bus lanes 206 are physically close relative to wavelengths of interest in this example, so digital lane data can be added to give the net spectral results.

The phasor generator 202 uses the data on the bus PHY 200 to generate the net phasor for one or more specified frequencies or ranges of frequencies. The phasor generator 202 can be implemented by any suitable hardware or combination of hardware and programming code such as software or firmware. For example, the phasor generator 202 can be implemented in digital logic circuits, processors or some combination thereof. In some embodiments, one or more components of the phasor generator 202 may be implemented as programming code running on a general purpose processors, ASIC, or FPGA, for example. Accordingly, a computing device operable to carry out the techniques described herein may include a tangible, non-transitory storage medium for storing programming code configured to implement the techniques disclosed herein.

In the example device shown in FIG. 2, the data on each of the internal bus lanes is sampled by the summer 212. The summer 212 adds the sampled values together and outputs the resulting summation, $X_m$, which represents the total magnitude of the digital data for a plurality of the internal data lanes 204. In some embodiments, each summation corresponds to a particular unit interval of the serializer output. In the example shown in FIG. 2, the summer 212 sums $W_m[0]$ with the corresponding input to the other serializers, namely $W_m[8]$, $W_m[16]$, $W_m[24]$, $W_m[32]$, $W_m[40]$, $W_m[48]$, and $W_m[56]$, wherein each of these data bits will be transmitted on the external bus lanes 206 during the same unit interval of the external bus. The number of summations computed will depend on the number of serializers. In the example shown in FIG. 2, eight summations are computed.

To account for the fact that the data received by the summer 212 at a single unit interval will be serialized before being transmitted over the bus, the transmitted phase for each of the eight summations can be computed. In the example device shown in FIG. 2, the phasor generator 202 includes a time-to-phase gain block 214 that converts the unit interval time, $T_{UI}$, to an equivalent phase angle step at the frequency of interest according to the time shift property of the Fourier transformation. The unit interval time, $T_{UI}$, represents the unit interval of the external bus lanes. The phase angle step is accumulated by the phase accumulator 216 to get the phase angle of the current unit interval. For example, the phase accumulator 216 may be implemented by computing a running sum to obtain the current phase angle. Placing the phase accumulator 216 after the time-to-phase gain block 214 allows accumulation to be done modulo pi to reduced storage size and eliminate rollover error due to finite storage size. In the example shown in FIG. 2, the phase accumulator 216 outputs a vector of the most recent eight phase angles, each phase angle corresponding with a specific one of the summations, $X_m$, computed by the summer 212.

Both the phase angles and the summations of internal bus lane values are output to the complex number generator 218, which combines the accumulated phase angles with the summations to give eight unit interval phasors. The unit interval phasors are then output to the phasor accumulator 220, which adds the unit interval phasors according to Equation 1 to generate the net phasor, Y(f). The net phasor can then be output to another component of the computing device, depending on the particular implementation. For example, the net phasor can be sent to a baseband processor and used to cancel out the interference generated by the data bus. The net phasor can also be sent to an encoder and used to determine an encoding scheme that will reduce the magnitude of the interference generated by the data bus at one or more frequencies.

The phasor technique described above avoids the use of anti-alias filters, waveform oversampling, and analog-to-digital converters (ADC's), which are normally used in standard FFT techniques. These advantages are very significant for hardware implementations. Additionally, the phasor technique does not require buffering of the time domain signal or storage of intermediate computational values. Unlike the FFT, the buffering and memory storage requirements of the phasor technique are small and independent of the desire time interval. Frequency resolution is also independent of the time interval, which is important in some assisted baseline cancellation applications where carrier frequencies are not harmonics of symbol rate. The phasor technique also uses far less internal storage than an FFT. It is also computationally more efficient than the FFT when spectral values are needed only at a few particular frequencies rather than over the entire frequency range from DC to the Nyquist frequency. However, the basic phasor approach tends to be less accurate when the pulse response is distorted, for example, not constant or not left-right symmetrical. Embodiments described herein provide techniques for improving the accuracy of the phasor approach to account for common types of signal distortions.

Figure 3:
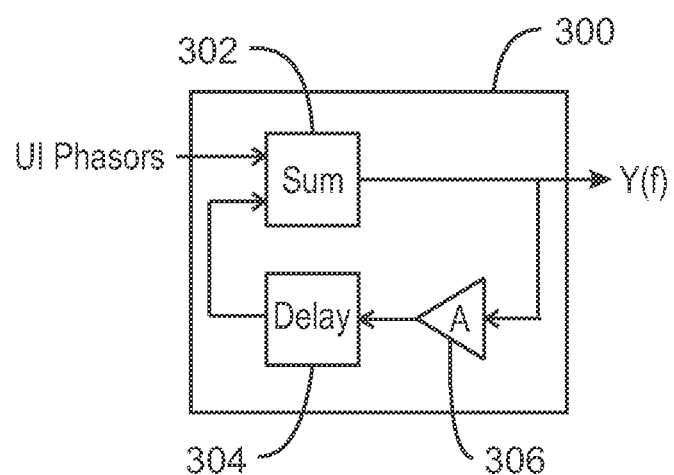
FIG. 3 is a block diagram of an example of a phasor accumulator that can be used to apply a windowing function to the net output phasor.

FIG. 3 is a block diagram of an example of a phasor accumulator that can be used to apply a windowing function to the net output phasor. By the nature of the phasor technique, the generated net phasor includes the effect of an implicit rectangular window (also known as a boxcar or Dirichlet window). Some applications benefit from the use of other window functions. For example, some assisted baseline cancellation systems may work better with windows matching those used in the radios themselves. Explicit window functions can be included by multiplication with the sampled signal data before transformation. In the phasor technique, the value of $y_n$ in the basic phasor transform equation (Equation 1) can be replaced by $w_n \cdot y_n$, where w is the desired window function.

Some spectral line coding systems may use a "running" phasor where the transform summation does not have a definite end point. The radio noise performance of such codes can be optimized by aging techniques that progressively reduce the influence of the older signal values, which have diminishing impact on present noise. Geometric and exponential aging can be inserted into the phasor transform equation as shown in Equation 2 below.

$$Y(f) = \sum_n A^{n-1} y_n e^{-i2\pi f \cdot n T_{UI}} \quad \text{(Eq. 2)}$$

In Equation 2, A is the aging factor, which can be a real number between zero and one, for example.

The phasor accumulator shown in FIG. 3 is one example of a device that can be used to compute a running phasor with aging. The phasor accumulator 300 may be the same as the phasor accumulator 220 described in relation to FIG. 2. The phasor accumulator 300 can include a summer 302, a delay unit 304, and a multiplier 306. In some embodiments, the input to the phasor accumulator 300 is the output of block 218 shown in FIG. 2. At each accumulation step, the current unit interval phasor is added to the net phasor computed by the accumulator 300 in the previous accumulation step. To implement the running window, the multiplier 306 multiplies the net phasor by the aging factor, A, at each accumulation step. Accordingly, the effect of previous unit interval phasors on the net accumulated phasor is reduced after each accumulation step.

The phasor accumulator 300 shown in FIG. 3 implements UI phasor accumulation at the serial signaling rate of the external bus lanes 206 (see FIG. 2). In some embodiments, the phasor accumulator can be implemented at the slower parallel signaling rate of the internal bus lanes 204.

Figure 4:
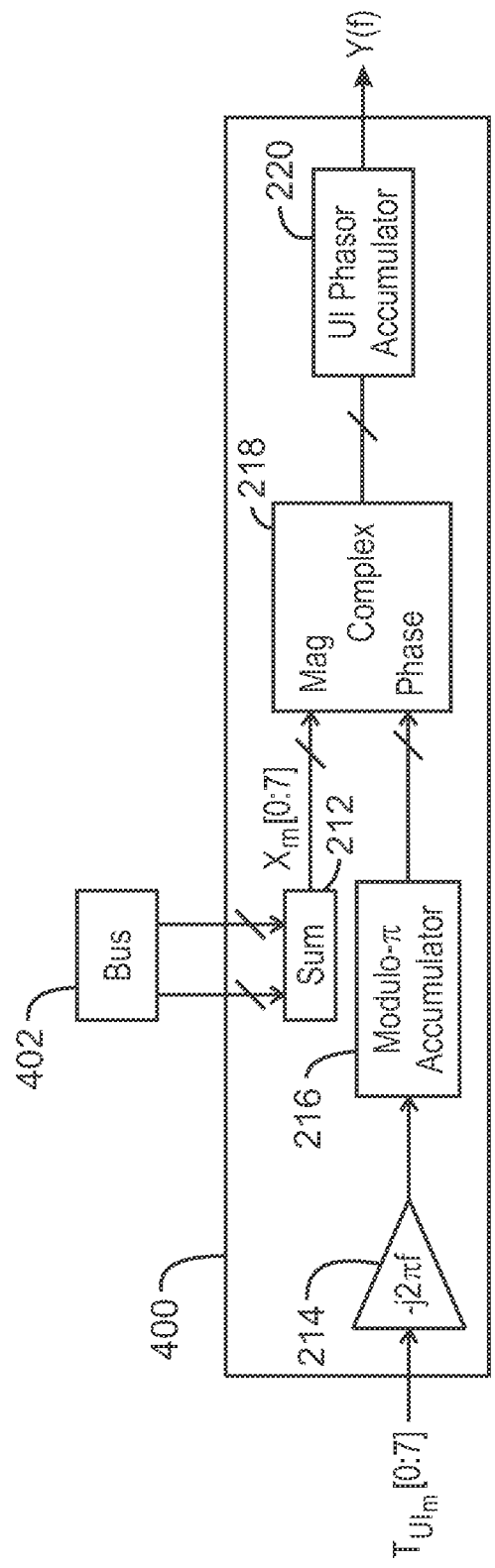
FIG. 4 is a block diagram of a phasor generator that can be used in a system that uses spread spectrum clocking or has duty cycle distortion.

FIG. 4 is a block diagram of a phasor generator that can be used in a system that uses spread spectrum clocking. Spread spectrum clocking (SSC) is a widely used technique that slowly and slightly modulates digital signal clock frequencies to meet electromagnetic interference (EMI) requirements. In some embodiments, the clock frequency may vary by less than 1% with a repetition period of less than 100 kHz. Spread spectrum clocking alters the spectral energy of the digital waveform by introducing a small and slow variation into the bus unit interval time, $T_{UI}$.

The phasor generator 400 of FIG. 4 takes the varying unit interval time of the external bus into account when generating the phasor. The phasor generator 400 of FIG. 4 operates in a similar manner to the phasor generator 202 discussed in relation to FIG. 2, and includes the summer 212 coupled to the bus 402, the time-to-phase gain block 214, the accumulator 216, the complex number generator 218, and the phasor accumulator 220. However, rather than receiving a single unit interval time, $T_{UI}$, the time-to-phase gain block 214 receives a time-dependent unit interval value, $T_{UI_m}$. The time-dependent unit interval value represents the current unit interval time of the external bus lanes at the time that the net phasor is being calculated. The time-dependent unit interval may be available from the SSC generation circuit of the system or obtained from a circuit that monitors the unit interval of the external bus, for example. Since SSC frequency variations tend to be very slow with respect to bus clocking frequencies, a single value for the unit interval time may be sufficiently accurate over one internal bus unit interval, which is equal to eight external bus unit intervals in the example shown in FIG. 2. Thus, in some embodiments, a single unit interval time can be used for all eight unit interval phasors generated by the complex number generator 218, even though the actual unit interval time may be slightly different for each of the eight unit interval phasors. In some embodiments, a different value of the unit interval time may be used for each unit interval phasor, in which case the time-to-phase gain block 214 receives a time-dependent unit interval value, $T_{UI_m}[0:m]$, where m+1 is equal to the number of unit interval phasors generated for each internal bus unit interval.

Figure 5:
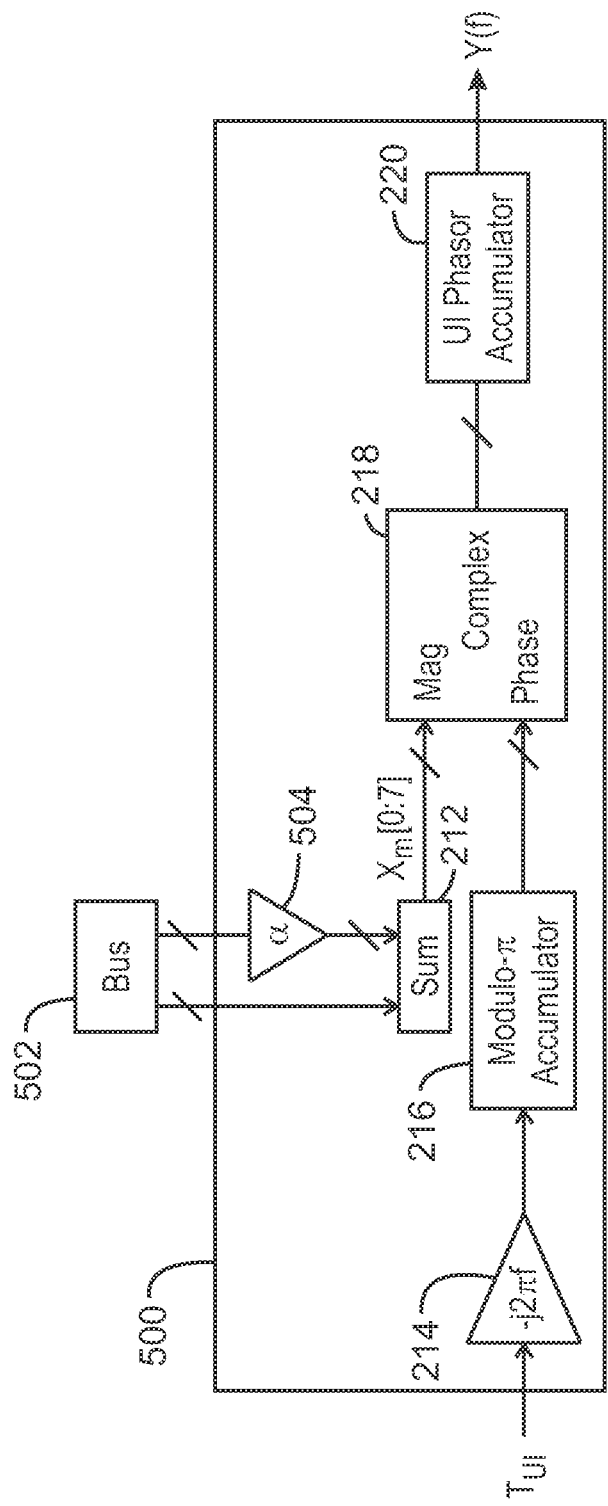
FIG. 5 is a block diagram of a phasor generator that can be used in a system that uses transmit pre-equalization.

FIG. 5 is a block diagram of a phasor generator that can be used in a system that uses transmit pre-equalization. Transmit pre-equalization, also referred to as de-emphasis, is employed in some busses using finite impulse response (FIR) filter techniques. Pre-equalization is used to compensate for losses over the data bus, which tend to be larger at higher frequencies. In pre-equalization, the level of all bits is reduced except for the first bit after a bit-level transition. This causes the high frequency content due to the transition to be emphasized compared to the low frequency content, which is de-emphasized.

One way to implement pre-equalization is to combine pre-equalization control bits, P, with data control bits, W, to generate the transmitted signal. The data control bits, W, can be received from the serializers 208. The pre-equalization control bits, P, can be generated by delay elements, then appropriately weighted and combined with data control bits in bus drivers, such as the bus drivers 210 of FIG. 2. The pre-equalization control bits, P, may be generated by the driver 210 according to a specified transfer function. For example, the equalization control bits may be generated using a first order FIR filter with a transfer function of $1+\alpha \cdot (1-z^{-1})$, wherein a is the factor that determines the level of de-emphasis applied to the bits. In this example, the desired pre-equalization control bits are given by $p=(1-z^{-1}) \cdot d$ where d is the data control bits. The operator $z^{-1}$ is a delay of one unit interval on the serialized bus lane 206, which can be implemented by a bit shift prior to serialization. The transmitted data on the serialized bus lane is then proportional to $d+\alpha p$, and the bus lane waveform no longer transitions between only two (binary) values. Thus, de-emphasis changes the spectral content of the transmitted digital waveform but does not change the digital information. In some embodiments, higher order filters may be used to generate the equalization control bits.

The phasor generator 500 shown in FIG. 5, takes into account the effects of de-emphasis on the bus waveforms when generating the phasor. The phasor generator 500 operates in a similar manner to the phasor generator 202 discussed in relation to FIG. 2, and includes the summer 212 coupled to the bus 502, the time-to-phase gain block 214, the phase accumulator 216, the complex number generator 218, and the phasor accumulator 220. However, the effects of de-emphasis are included in the phasor generation by scaling and adding the pre-equalization bits to the data bits to replicate the pre-equalization that is occurring in the driver 210 (FIG. 2). As shown in FIG. 5, the summer 212 adds each data control bit, W, to its corresponding scaled pre-equalization control bit, P. In some embodiments, the pre-equalization control bits can be received from the bus PHY 502. In some embodiments, the pre-equalization control bits can be generated by a separate dedicated component. The pre-equalization control bits are scaled by the gain block 504 according to a scaling factor, a.

Figure 6:
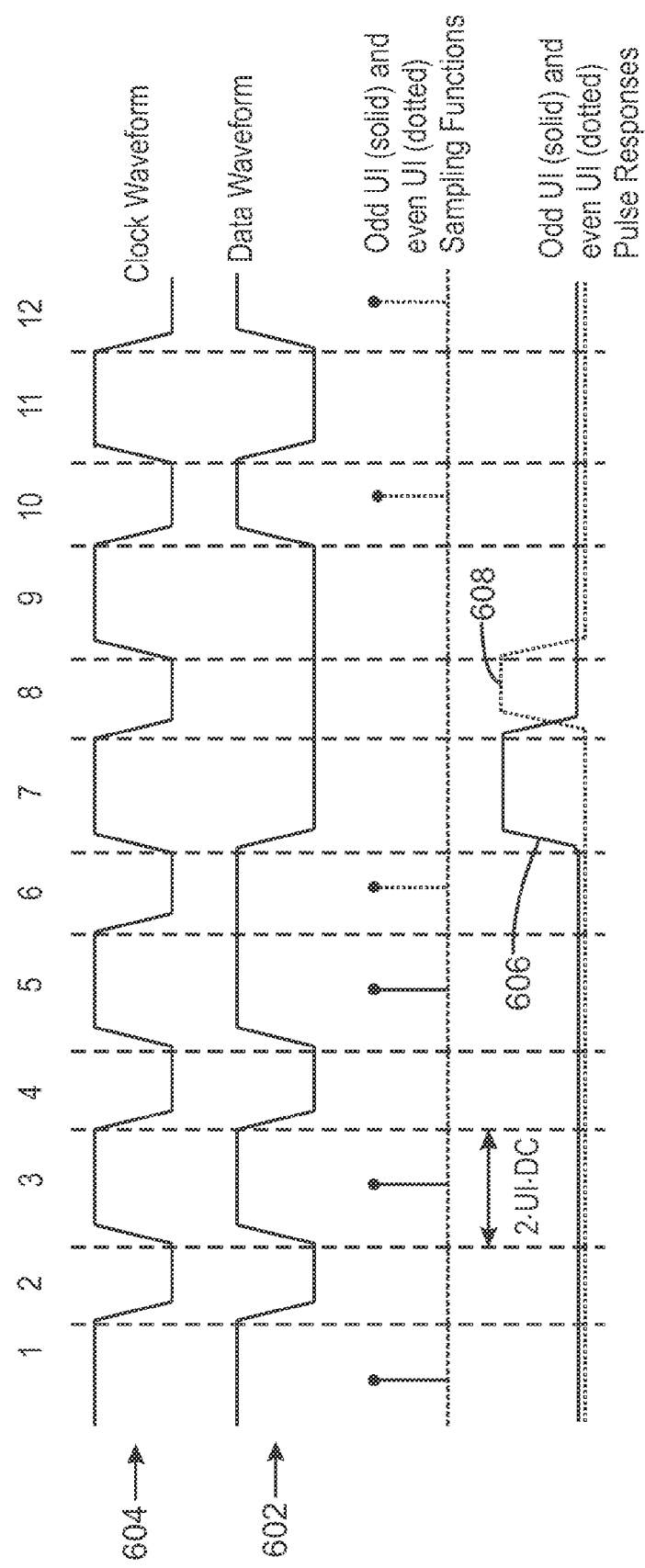
FIG. 6 is a timing diagram showing how the phasor technique can be adapted for use with a data bus that exhibits duty cycle distortion.

FIG. 6 is a timing diagram showing how the phasor technique can be adapted for use with a data bus that exhibits duty cycle distortion. Duty cycle distortion is common in systems that uses double data rate (DDR) clocking. DDR clocking may be used in Dynamic Random-Access Memory (DRAM) interfaces, but is not limited to DRAM interfaces. The timing diagram 600 includes a data waveform 602 and a clock waveform 604. The unit intervals of the data waveform are numbered 1 through 12 at the top of the diagram. In dual data rate (DDR) signaling, bus data is registered on both edges of the bus clock rather than just the rising or falling edge. As shown in FIG. 6, the duty cycle of the clock waveform varies from an ideal of 50 percent. Imperfections in the DDR clock's duty cycle introduce distortion in the data waveform 602. This distortion is shown in FIG. 6 by the fact that the width of the odd unit intervals are longer than the width of the even unit intervals. Accordingly, the data waveform 602 can no longer be characterized using a single pulse response. Rather, odd unit intervals are characterized by a first pulse response 606 and even unit intervals are characterized by a second pulse response 608. Therefore, the data waveform 602 cannot be approximated by the convolution of the pulse sampling function and a single pulse response.

The spectral content of the data waveform 602 can be determined using the phasor technique by building separate phasors corresponding to the even and odd unit intervals. In some embodiments, two phasor generators are coupled to the bus PHY, one that processes digital data corresponding to the odd intervals of the data waveform 602 and one that processes data corresponding to the even intervals of the data waveform 602. The two sampling functions 610 are shown in the diagram 600 of FIG. 6, wherein the odd unit interval sampling function is shown with solid lines and the even unit interval sampling function is shown with dotted lines. The effects of different pulse responses for even and odd intervals can then be effectively handled using one of several possible techniques discussed below.

One such technique involves spectral line coding. In a particular type of spectral line coding referred to as selective inversion, specific bits or sets of parallel bits can be inverted based on the effect of the inversion on the spectral content of the data bus. Selective inversion spectral line coding can be used to reduce the electromagnetic energy at specific frequencies, which can be seen as a notch depth in a plot of electromagnetic energy versus frequency. In some embodiments, coding decisions for even unit intervals can be made based only on the phasor generated from even unit intervals, and decisions for odd unit intervals can be based only on the phasor generated from odd unit intervals.

The effects on notch depth achieved by a selective inversion spectral line code are shown in Table 1 below for 8 lanes of a 1600 MT/s DDR bus with a coding notch in the 1900 MHz cellular band. With perfect 50% duty cycle, this method suffers a few dB of performance degradation compared to the basic phasor technique. This is due to the use of only half of available bus data information for making coding decisions in any unit interval. However, the notch depth is robust against duty cycle distortion while notches created using the basic phasor technique are degraded severely.

TABLE 1 selective inversion SLC notch depth using the basic phasor technique versus using separate even and odd phasors.

| DDR Bus Duty Cycle | Selective inversion SLC notch depth using the basic phasor technique | Selective inversion SLC notch depth using separate even and odd phasors |
|---|---|---|
| 50% | 34 dB | 32 dB |
| 48% | 19 dB | 32 dB |
| 45% | 12 dB | 31 dB |
| 40% | 8 dB | 31 dB |

In some embodiments, the two phasors can be used to generate a single combined phasor by linearly combining the even and odd phasors with a weighting factor that represents their relative contribution to the net spectral noise at the frequency of interest. The combined phasor can then be used to make coding decisions in spectral line coding or to implement baseband cancellation, for example. The weighting factor is a function of the duty cycle, which can be determined by analyzing the clock waveform using dedicated analog or digital circuits. In some embodiments, the weighting factor can be determined using an adaptive circuit driven by the radio baseband error vectors or the radio received signal strength indicator (RSSI), as described below in relation to FIG. 7.

Figure 7:
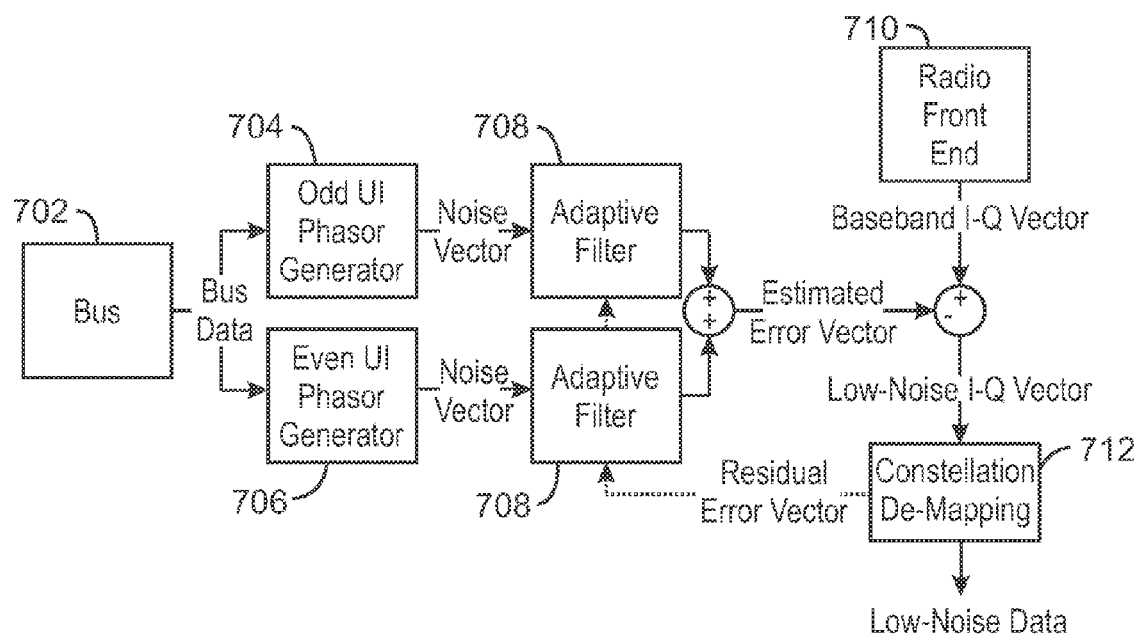
FIG. 7 is a block diagram of an assisted baseband cancellation system that uses the odd and even phasors described above in relation to FIG. 6.

FIG. 7 is a block diagram of an assisted baseband cancellation system that uses the odd and even phasors described above in relation to FIG. 6. The system shown in FIG. 7 includes a bus PHY 702, an odd UI phase generator 704, and an even UI phase generator 706. The bus PHY may be the bus PHY described above in relation to FIG. 2. As discussed above in relation to FIG. 6, the odd UI phasor generator 704 generates the odd phasor from the odd bus unit intervals and the even UI phasor generator 706 generates the even phasor from the even bus unit intervals. The even phasor and the odd phasor are each sent to a separate adaptive filter 708. The outputs of the adaptive filters 708 are then added together to generate an estimated error vector which represents the estimated noise level being generated by the data bus.

The system also includes a radio front end 710, which receives radio frequency signals of any suitable frequency range through an antenna for example. The radio front end uses the received the signals to generate a baseband I-Q vector which represents the transmitted radio signal. The estimated error vector is subtracted from the baseband I-Q vector to generate a low noise I-Q vector, which is sent to a constellation de-mapping component 712. The constellation de-mapping component 712 generates low noise data from the I-Q vector, which can be sent to the component of the electronic device configured to use the data. The constellation de-mapping component 712 also generates a residual error vector that represents the deviation of the constellation points of the low-noise I-Q vector from the ideal constellation points. The residual error vector is sent to each of the adaptive filters 708 to adjust the output provided by the adaptive filters. For example, the noise vector may be amplified, reduced, or phase shifted in accordance with the residual error vector. In this way, the contribution of the odd UI phasor generator 704 and the even UI phasor generator 706 will be adaptively balanced to account for each phasor's differing contribution to the overall bus noise.

Figure 8:
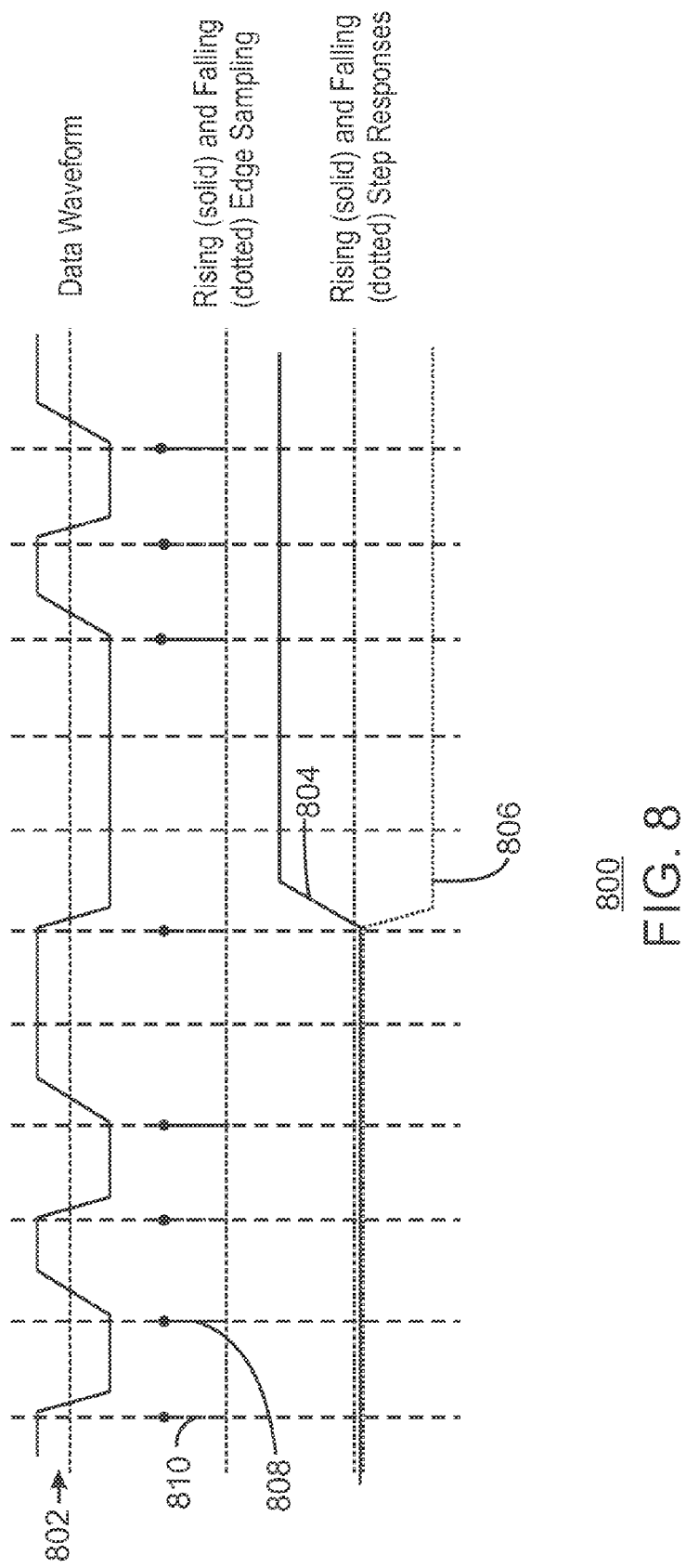
FIG. 8 is a timing diagram showing how the phasor technique can be implemented in a bus with mismatched rise and fall times.

FIG. 8 is a timing diagram showing how the phasor technique can be implemented in a bus with mismatched rise and fall times. Even with perfect clocking duty cycle between even and odd unit intervals, there can be duty cycle mismatch between high and low pulses on digital buses and mismatched rise and fall times of the driver. The timing diagram 800 includes a data waveform 802 that exhibits a mismatch in rise time versus fall time. The timing diagram 800 also shows the rising edge step response 804, the falling edge step response 806, the rising edge step sampling function 808 (shown in solid lines), and the falling edge sampling function 810 (shown in dotted lines). The data waveform 802 can be composed from the sum of two waveforms, one from the convolution of a rising edge sampling function 804 with the rising step response 808 and the other from the convolution of the falling edge sampling function 810 with the falling step response 806.

The spectral content of the bus can be determined by generating separate phasors for rising and falling edges, similar to what was described above for even and odd unit intervals in the case of UI duty cycle distortion. The two phasors, referred to herein as the rising phasor and the falling phasor, can then be used in various ways to make coding and cancellation decisions. In some embodiments, a single phasor can be generated by computing a weighted linear sum of the "rising" and "falling" phasors. In some embodiments, each phasor is applied to decisions affecting their respective edges separately. For example, in selective inversion spectral line coding, some coding decisions may cause a falling edge. In such a case, the falling phasor may be used to determine whether to flip the corresponding bit. In some cases, a coding decision may cause both a falling edge and a rising edge to be created, in which case, both the rising phasor and the falling phasor can be used to determine whether to flip the bit. For example, the effect of a hypothetical bit flip may be computed for each phasor. The effect on each phasor may be characterized as difference value computed by subtracting the phasor computed before the bit flip and the phasor computed after the bit flip. The net effect of the bit flip can then be computed by adding the difference values. The effects on notch depth achieved by a selective inversion spectral line code are tabulated below for 8 lanes of a 1600 MT/s DDR bus with a coding notch in the 1900 MHz cellular band.

TABLE 2 selective inversion SLC notch depth using the basic phasor technique versus using separate phasors for rising and falling edges.

| Rise time, fall time (as fraction of UI) | DDR Bus Duty Cycle | Notch depth using the basic phasor technique | Notch depth using separate rising & falling edge phasors |
|---|---|---|---|
| 50%, 50% | 50% | 34 dB | 24 dB |
| 45%, 55% | 50% | 15 dB | 23 dB |
| 40%, 60% | 50% | 9 dB | 23 dB |
| 60%, 80% | 50% | 5 dB | 22 dB |

As seen in the Table 2, there is a significant advantage to using separate phasors for rising and falling edges under conditions that are more realistic for many practical buses. In some embodiments, four separate phasors can be generated and used to make coding decisions. For example, even and odd phasors may be generated as discussed above and relation to FIGS. 6 and 7, and falling and rising phasors may also be generated. The effect of tracking and applying four separate phasors to deal with both duty cycle distortion and edge mismatch simultaneously is shown in Table 3, which can be compared to the last line in table 2.

TABLE 3 selective inversion SLC notch depth using the basic phasor technique versus using separate phasors for rising and falling edges.

| Rise time, fall time (as fraction of UI) | DDR Bus Duty Cycle | Notch depth using the basic phasor technique | Notch depth using separate even, odd, rise, fall phasors |
|---|---|---|---|
| 60%, 80% | 40% | 3 dB | 22 dB |

In some embodiments, voting rules can be used to select between the separate rising and falling phasors when making coding or cancellation decisions. For example, the phasor can be selected based on the relative magnitudes of the two phasors. In some embodiments, the phasor is selected based on the change in phasor magnitudes. For example, after updating the falling phasor and the rising phasor with new bus data, the previous values of the phasors can be vector subtracted from the updated values of the phasors. The magnitude of the vector subtractions indicates which phasor changed more from its previous value. The coding decision can be made based on the phasor whose vector subtraction is larger.

Figure 9:
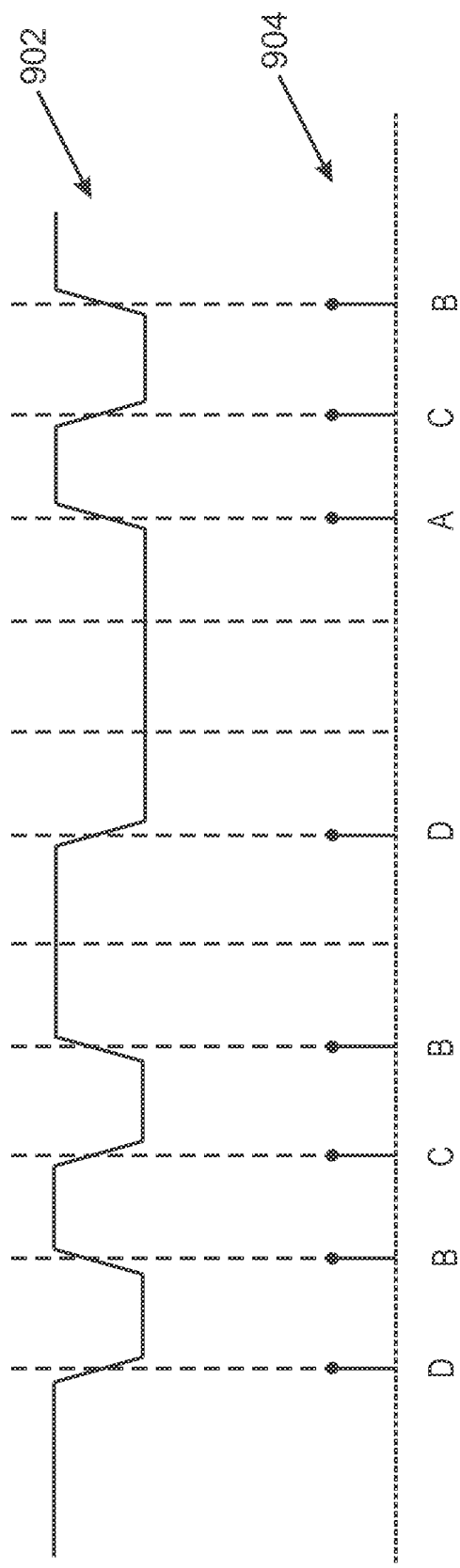
FIG. 9 is a timing diagram showing how the phasor technique can be implemented in a bus with slow edge settling time.

FIG. 9 is a timing diagram showing how the phasor technique can be implemented in a bus with slow edge settling time. The edge settling time is the time it takes for the electrical effects of a bit transition to die off. In a bus with an edge settling time longer than a unit interval, the transition from one bit level to another may affect the waveform at other bit times that come later. Thus, the spectral content of the data bus may depend on the order of data bits.

The spectral content of a data bus with an edge settling time of longer that one unit interval can be determined by generating different edge sampling functions for different preceding data patterns. For example, if the edge settling time is between one and two unit intervals, two rising edge and two falling edge sampling functions can be used. One edge sampling function could apply to the rising edges preceded by two logical low levels (001 bit pattern) while another sampling function could apply to the rising edges preceded by a logical high level followed by a logical low level (101 bit pattern). Two falling edge sampling functions could be defined similarly. Table 4 shows the bit patterns corresponding to each of the four phasors described above, labeled Phasor A through B.

TABLE 4 bit patterns for four edge sampling functions in a bus with an edge settling time of between one and two unit intervals.

| | | | |
|---|---|---|---|
| 0 | 0 | 1 | Phasor A |
| 1 | 0 | 1 | Phasor B |
| 0 | 1 | 0 | Phasor C |
| 1 | 1 | 0 | Phasor D |

The timing diagram 900 of FIG. 9 includes a data waveform 902 that represents the data to be transmitted over a data bus with an edge settling time between one and two unit intervals. It will be appreciated that the data waveform 902 is simplified for the sake of clarity and does not show the electrical effects of the slow settling time. The timing diagram 900 also includes four edge sampled pulse responses 904, which are generated using the information from table 4. The letter below each pulse identifies the specific phasor that the pulse corresponds with. Each of the four sampling functions shown in FIG. 9 can be used to generate a different phasor. The four resulting phasors together provide an accurate representation of the spectral content of the data waveform 902 in spite of the slow edge setting time exhibited by the data bus. It will be appreciated that additional sampling functions with longer patterns of preceding data can be defined depending on the edge settling time. For example, if the edge settling time is between two and three unit intervals, the preceding three unit intervals can be accounted for, resulting in eight different sampling functions and eight phasors, as shown in the table below.

TABLE 4 bit patterns for four edge sampling functions in a bus with an edge settling time of between one and two unit intervals.

| | | | | |
|---|---|---|---|---|
| 0 | 0 | 0 | 1 | Phasor A |
| 0 | 1 | 0 | 1 | Phasor B |
| 1 | 0 | 0 | 1 | Phasor C |
| 1 | 1 | 0 | 1 | Phasor D |
| 0 | 0 | 1 | 0 | Phasor E |
| 0 | 1 | 1 | 0 | Phasor F |
| 1 | 0 | 1 | 0 | Phasor G |
| 1 | 1 | 1 | 0 | Phasor H |

Upon generating the phasors corresponding to each of the sampling patterns, coding and cancellation decisions can then be based on the separate phasors created from the separate sampling functions in several ways. In some embodiments, the phasors can be used separately. For example, for a particular coding or cancellation decision occurring with regard to a particular unit interval, the phasor built from the edge response that corresponds to the bus data event can be selected. With reference to the specific example from FIG. 9, phasor A may be used to make coding or cancellation decisions for unit intervals ending with a 001 bit pattern, and phasor C may be used to make coding or cancellation decisions for unit intervals ending with a 010 bit pattern.

In some embodiments, a single combined phasors may be generated from the separate phasors. Various mathematical functions could be used to generate the combined phasor, depending on the design considerations of a particular implementation. For example, the combined phasor could be generated as a weighted linear summation of all the phasors. The weighting factors could be complex coefficients. These complex coefficients could be determined from system characterization and stored in hardware or firmware for later use, or determined automatically during system operation from an error metric such as radio error vectors, RSSI or error rate.

In some embodiments, coding or cancellation decisions can be selected based on a voting scheme or other selection algorithm. For example, the phasor with the greatest magnitude or greatest magnitude difference from a previous unit interval can be selected.

Figure 10:
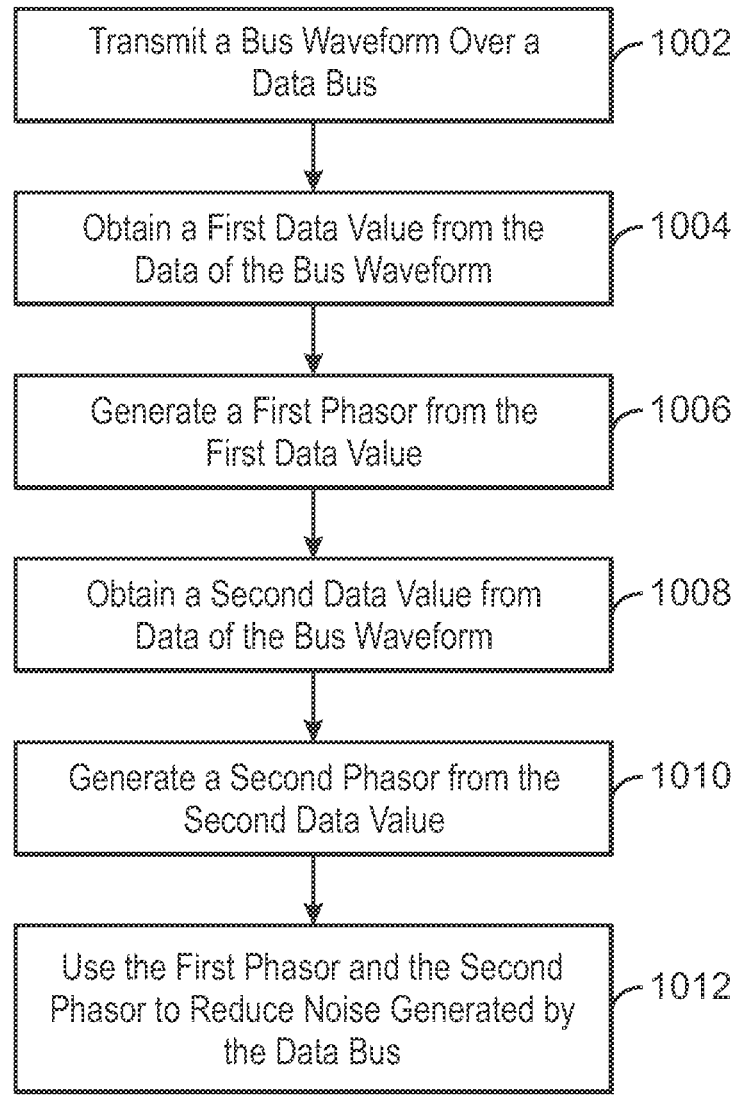
FIG. 10 is a process flow diagram summarizing a method of determining the spectral content of a data bus.

FIG. 10 is a process flow diagram summarizing a method of determining the spectral content of a data bus. The method 1000 can be performed by any electronic device that transmits data over a bus. The method 1000 may be implemented by logic embodied in hardware, such as logic circuitry or one or more processors configured to execute instructions stored in a non-transitory, computer-readable medium. The ordering of blocks 1002 to 1012 are not intended to indicate that the operations described must occur in a particular order. Indeed, many of the operations described in relation to the method 1000 can occur in an order different from what is shown in FIG. 10 or even in parallel.

The method may include block 1002, wherein a bus waveform is transmitted over a data bus. The bus waveform can encode data, including digital data, to be transmitted over the bus. The bus can be any type of bus operating according to any communication protocol. In some embodiments, the bus is an internal bus, such as bus between a processor and a memory device. In some embodiments, the bus is an external bus that transmits data between separate devices over a cable.

At block 1004, a first data value is obtained from the data to be transmitted over a data bus. The first data value can correspond, for example, to odd unit intervals, even unit intervals, rising edges, or falling edges. In some embodiments, the data value is obtained by monitoring for a particular data pattern of data to be transmitted over the bus.

At block 1006, a first phasor is generated from the first data value. The first phasor may be generated as described above.

At block 1008, a second data value is obtained from the data to be transmitted over a data bus. The second data value can also correspond to odd unit intervals, even unit intervals, rising edges, or falling edges. In some embodiments, the data value is obtained by monitoring for a particular data pattern of data to be transmitted over the bus. The second data value will include different digital data compared to the first data value.

At block 1010, a second phasor is generated from the second data value. The first phasor may be generated as described above. In some embodiments, additional data values may be obtained. Any suitable number of data values may be obtained and corresponding phasors generated in accordance with the design details of a particular implementation. All of the phasors taken together provide an indication the spectral energy content of the data to be transmitted over the data bus.

At block 1012, the phasors can be used to reduce noise generated by the data bus. For example, the phasors can be used to make coding decisions in a spectral line coding algorithm, such as a selective inversion spectral line coding. The phasors can also be used for canceling the bus interference in a radio receiver, for example. The phasors can be used in substantially any method, device, or system that uses a description of the spectral energy content of the data being transmitted over a data bus. As described above, the phasors can be used in a variety of ways for making coding and cancellation decisions. In some embodiments, the phasors can be combined into a single combined phasor, for example, through a weighted summation of the phasors. In some embodiments, a voting rule can be used to select a phasor on which to base coding and cancellation decisions.

Figure 11:
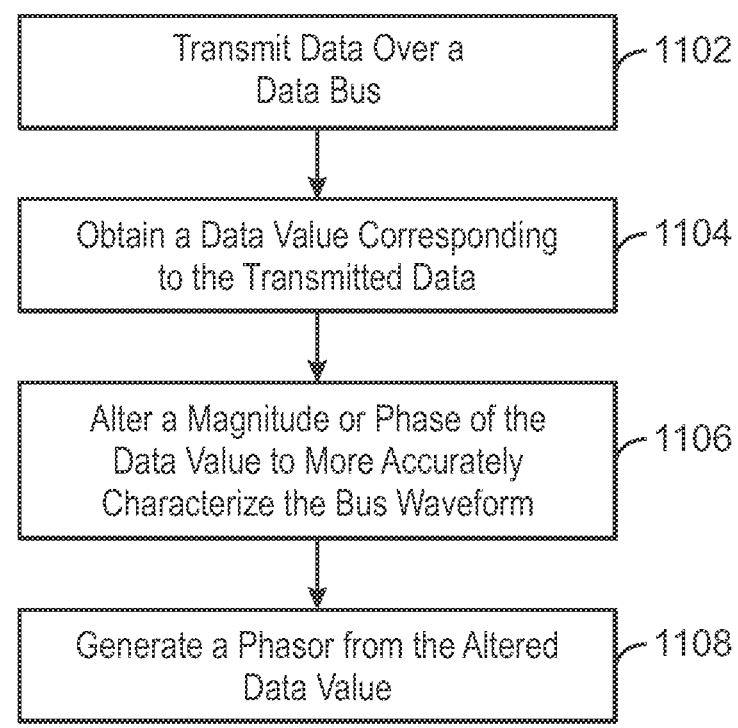
FIG. 11 is a process flow diagram summarizing another method of determining the spectral content of a data bus.

FIG. 11 is a process flow diagram summarizing another method of determining the spectral content of a data bus. As with the method 1000 of FIG. 10, the method 1100 can be performed by any electronic device that transmits data over a bus and can be implemented by logic embodied in hardware, such as logic circuitry or one or more processors configured to execute instructions stored in a non-transitory, computer-readable medium. The ordering of blocks 1102 to 1112 are not intended to indicate that the processes described must occur in a particular order. Indeed, many of the operations described in relation to the method 1100 can occur in an order different from what is shown in FIG. 11 or even in parallel.

The method may include block 1102, wherein data is transmitted over a data bus. At block 1104, a data value is obtained from the data to be transmitted over a data bus. The data value can correspond, for example, to odd unit intervals, even unit intervals, rising edges, or falling edges. In some embodiments, the data value is obtained by monitoring for a particular data pattern of data to be transmitted over the bus.

At block 1106, the magnitude or phase of the data value is altered to more accurately characterize the bus waveform from which the data was obtained. For example, if the bus implements pre-equalization, the relative amplitude of each of the data values sample points can be altered according to the level of pre-equalization applied to the actual bit in the data waveform transmitted over the bus. If the bus implements spread spectrum clocking, a phase can be calculated and applied to the data value based on the unit interval time at the time that the corresponding bit is transmitted.

At block 1108, the altered data value can be used to compute the net phasor. The computed phasor can be used to reduce noise generated by the data bus. Furthermore, method 1100 can be used in combination with the method 1000 of FIG. 10. For example, one or more of the phasors described in FIG. 10 can be computed using the altered data value described in method 1100.

Figure 12:
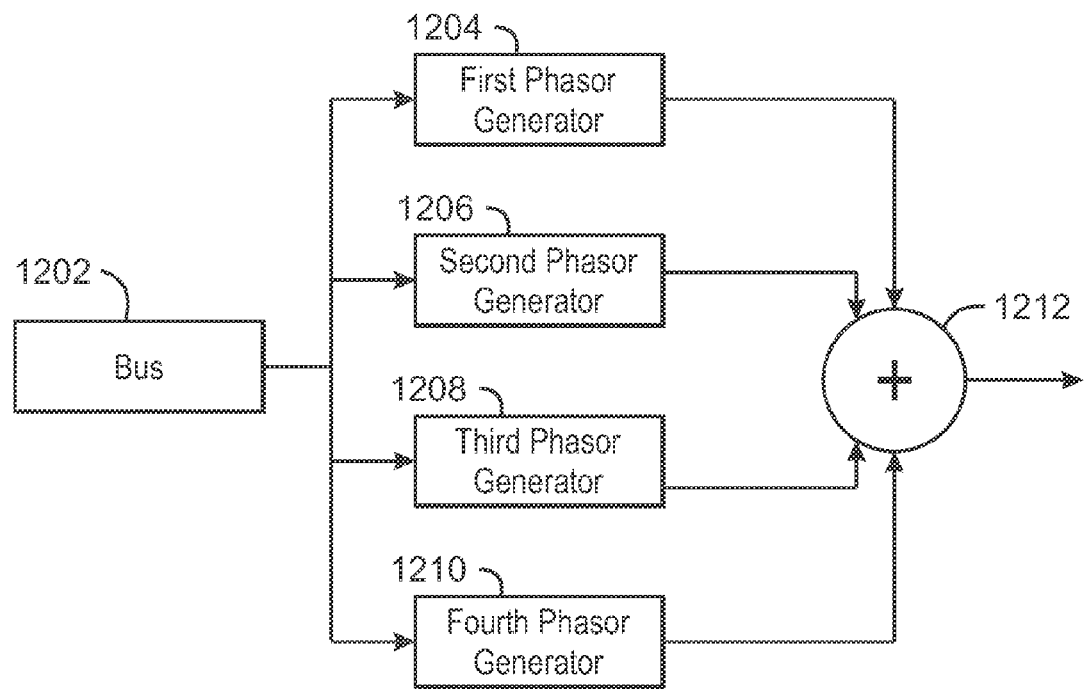
FIG. 12 is a simplified block diagram of a system that can estimate the spectral content of a data bus.

FIG. 12 is a simplified block diagram of a system that can estimate the spectral content of a data bus. The system 1200 shown in FIG. 12 includes a data bus 1202 with a plurality of signal lines. The system 1200 also includes a first phasor generator 1204 to obtain a first data value based on the data to be transmitted over the data bus 1202 and generate a first phasor based on the first data value. The system 1200 also includes a second phasor generator 1206 to obtain a second data value based on the data to be transmitted over the data bus 1202 and generate a second phasor based on the second data value. The system 1200 can also include a third phasor generator 1208 to obtain a third data value and generate a third phasor. The system 1200 can also include a fourth phasor generator 1210 to obtain a fourth data value generate a fourth phasor. The phasors can be added together by summer 1212. The sum of the first phasor, the second phasor, the third phasor, and the fourth phasor indicate, at least in part, the spectral content of the data to be transmitted over the data bus 1202.

In some examples, the first data value is generated based on rising edges of the data, the second data value is generated based on falling edges of the data, the third data value is generated based on odd unit intervals of the data bus, and the fourth data value is generated based on even unit intervals of the data bus. In some examples, the first data value corresponds with rising edges of the data that are preceded by a first specified bit sequence, the second data value corresponds with rising edges that are preceded by a second specified bit sequence different from the first specified bit sequence. The third data value is based on falling edges of the data that are preceded by a third specified bit sequence, and fourth data value based on falling edges of the data that are preceded by a fourth specified bit sequence.

Example 1

An electronic device is described herein. The electronic device includes a data bus with a plurality of signal lines. The electronic device also includes a first phasor generator to obtain a first data value based on the data to be transmitted over the data bus and generate a first phasor based on the first data value. The electronic device also includes a second phasor generator to obtain a second data value based on the data to be transmitted over the data bus and generate a second phasor based on the second data value. The sum of the first phasor and the second phasor indicate, at least in part, the spectral content of the data to be transmitted over the data bus.

In some embodiments, the electronic device includes a radio to receive the first phasor and the second phasor, sum the first phasor and the second phasor to generate an error vector, and use the error vector to cancel the radio frequency interference generated by the data bus and received by the radio. In some embodiments, the electronic device includes a spectral line encoder to receive the first phasor and the second phasor and coding decisions affecting the odd unit intervals are made based on the first phasor and coding decisions affecting the even unit intervals are made based on the second phasor.

The first data value and the first phasor may correspond to odd unit intervals of the data bus and the second data value and the second phasor may correspond to even unit intervals of the data bus. In some embodiments, the first data value corresponds to rising edges of the data and the second data value pulse sample is generated based on corresponds to falling edges of the data. In some embodiments, the first data value corresponds with rising edges of the data that are preceded by a first specified bit sequence and the second data value corresponds with rising edges that are preceded by a second specified bit sequence different from the first specified bit sequence.

The electronic device can also include a third phasor generator to obtain a third data value corresponding to odd unit intervals of the data bus and generate a third phasor. The electronic device can also include a fourth phasor generator to obtain a fourth data value corresponding to even unit intervals of the data bus and generate a fourth phasor. In some embodiments, the third phasor generator obtains the third data value corresponding to falling edges of the data that are preceded by a third specified bit sequence and the fourth phasor generator obtains the fourth data value corresponding to falling edges of the data that are preceded by a fourth specified bit sequence.

Each phasor generator can include a phase generation component to receive a time-dependent unit interval time corresponding to the spread spectrum clocking signal. In the electronic device, the magnitude of the data transmitted over the data bus may be determined by data control bits and pre-driver equalization control bits. Each phasor generator can adjust the magnitude of the data received from the data bus according to the corresponding pre-driver equalization control bit. The data bus may be a USB data bus.

Example 2

A method is described herein. The method includes obtaining a first data value based on data to be transmitted over a data bus and obtaining a second data value based on the data to be transmitted over the data bus. The method also includes generating a first phasor from the first data value and generating a second phasor from the second data value. The sum of the first phasor and the second phasor indicate, at least in part, the spectral content of the data to be transmitted over the data bus.

In some embodiments, the method includes combining the first phasor and the second phasor to generate an error vector, and subtracting the error vector from a radio signal to cancel the radio frequency interference generated by the data bus.

In some embodiments, obtaining the first data value includes obtaining data corresponding to odd unit intervals of the data bus, and obtaining the second data value comprises obtaining data corresponding to even unit intervals of the data bus.

In some embodiments, the method includes encoding the data transmitted to be transmitted over the data bus using the first phasor and the second phasor, wherein coding decisions affecting the odd unit intervals are based on the first phasor generated from the odd unit intervals and coding decisions affecting the even unit intervals are based on the second phasor generated from the even unit intervals.

In some embodiments, obtaining the first data value includes identifying rising edges of the data, and obtaining the second data value includes identifying falling edges of the data. In some embodiments, the method includes obtaining a third data value corresponding to odd unit intervals of the data bus and generating a third phasor based on the third data value, and obtaining a fourth data value corresponding to even unit intervals of the data bus and generating a fourth phasor based on the forth data value.

In some embodiments, the method includes identifying a bit sequence of the data and comparing the bit sequence to a specified bit sequence, wherein the first data value corresponds with rising edges of the data that are preceded by a first specified bit sequence; and the second data value corresponds with rising edges that are preceded by a second specified bit sequence different from the first specified bit sequence. In some embodiments, the method includes obtaining a third data value corresponding to falling edges of the data that are preceded by a third specified bit sequence, and obtaining a fourth data value corresponding to falling edges of the data that are preceded by a fourth specified bit sequence. Generating the first phasor may include receiving a time-dependent unit interval time corresponding to the spread spectrum clocking signal. The method may also include adjusting a magnitude of the first data value according to a corresponding pre-driver equalization control bit. The data bus may be a USB data bus.

Example 3

An electronic device is described herein. The electronic device includes logic to obtain a data value from data to be transmitted over a data bus. The electronic device also includes logic to alter a magnitude or phase of the data value to more accurately characterize a bus waveform corresponding to the data. The electronic device also includes logic to generate a phasor from the altered data value and logic to use the phasor to reduce noise generated by the data bus.

In some embodiments, the logic to alter a magnitude or phase of the data value includes logic to alter the magnitude of the data value based on pre-equalization bits used to generate the bus waveform. In some embodiments, the logic to alter a magnitude or phase of the data value includes logic to alter the phase of the data value according to a time-dependent unit interval time that corresponds with the spread spectrum clocking used to generate the bus waveform. The logic to generate the phasor may generate a unit interval phasor for each unit interval of the data bus, multiply each unit interval phasor by an aging factor, and sum the unit interval phasors to generate the phasor. The data bus may be a USB data bus.

Example 4

A non-transitory, tangible, computer-readable medium, comprising instructions to direct the operations of processor is described herein. The instructions instruct the processor to obtain a first pulse sample based on data to be transmitted over a data bus and obtain a second pulse sample based on the data to be transmitted over the data bus. The instructions also instruct the processor to generate a first phasor from the first pulse sample and generating a second phasor from the second pulse sample. The sum of the first phasor and the second phasor indicate, at least in part, the spectral content of the data to be transmitted over the data bus.

In some embodiments, the non-transitory, tangible, computer-readable medium includes instructions to direct the processor to obtain the first pulse sample from rising edges of the data, and instructions to direct the processor to obtain the second pulse sample from falling edges of the data. In some embodiments, the non-transitory, tangible, computer-readable medium includes instructions to direct the processor to obtain the first pulse sample from odd unit intervals of the bus, and instructions to direct the processor to obtain the second pulse sample from even unit intervals of the bus.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An electronic device, comprising:
a data bus comprising one or more signal lines;
a first phasor generator to obtain a first data value based on the data to be transmitted over the data bus and generate a first phasor based on the first data value; and
a second phasor generator to obtain a second data value based on the data to be transmitted over the data bus and generate a second phasor based on the second data value;
wherein a sum of the first phasor and the second phasor indicate, at least in part, the spectral content of the data to be transmitted over the data bus.

2. The electronic device of claim 1, comprising a radio to receive the first phasor and the second phasor, sum the first phasor and the second phasor to generate an error vector, and use the error vector to cancel the radio frequency interference generated by the data bus and received by the radio.

3. The electronic device of claim 1, wherein the first phasor is generated from data in odd unit intervals of the data bus and the second phasor generated from data in even unit intervals of the data bus.

4. The electronic device of claim 1, comprising a spectral line encoder to receive the first phasor and the second phasor, wherein the first data value is based on odd unit intervals, the second data value is based on even unit intervals, and coding decisions affecting the odd unit intervals are made based on the first phasor and coding decisions affecting the even unit intervals are made based on the second phasor.

5. The electronic device of claim 1, wherein the first data value is generated based on rising edges of the data and the second data value is generated based on falling edges of the data.

6. The electronic device of claim 5, comprising:
a third phasor generator to obtain a third data value based on odd unit intervals of the data bus and generate a third phasor; and
a fourth phasor generator to obtain a fourth data value based on even unit intervals of the data bus and generate a fourth phasor.

7. The electronic device of claim 1, wherein the first data value corresponds with rising edges of the data that are preceded by a first specified bit sequence; and the second data value corresponds with rising edges that are preceded by a second specified bit sequence different from the first specified bit sequence.

8. The electronic device of claim 7, comprising:
a third phasor generator to obtain a third data value based on falling edges of the data that are preceded by a third specified bit sequence; and
and a fourth phasor generator to obtain a fourth data value based on falling edges of the data that are preceded by a fourth specified bit sequence.

9. The electronic device of claim 1, wherein the first phasor generator and the second phasor generator each comprise a phase generation component to receive a time-dependent unit interval time corresponding to the spread spectrum clocking signal.

10. The electronic device of claim 1, wherein:
a magnitude of data transmitted over the data bus is determined by data control bits and pre-driver equalization control bits; and
the first phasor generator and the second phasor generator are to adjust the magnitude of the data received from the data bus according to the corresponding pre-driver equalization control bit.

11. The electronic device of claim 1, wherein the data bus is a Universal Serial Bus (USB) data bus.

12. A method, comprising:
obtaining a first data value based on data to be transmitted over a data bus;
obtaining a second data value based on the data to be transmitted over the data bus; and
generating a first phasor from the first data value and generating a second phasor from the second data value;
wherein a sum of the first phasor and the second phasor indicate, at least in part, the spectral content of the data to be transmitted over the data bus.

13. The method of claim 12, comprising combining the first phasor and the second phasor to generate an error vector, and subtracting the error vector from a radio signal to cancel the radio frequency interference generated by the data bus.

14. The method of claim 12, wherein:
obtaining the first data value comprises obtaining data corresponding to odd unit intervals of the data bus; and
obtaining the second data value comprises obtaining data corresponding to even unit intervals of the data bus.

15. The method of claim 14, comprising encoding the data transmitted to be transmitted over the data bus using the first phasor and the second phasor, wherein coding decisions affecting the odd unit intervals are based on the first phasor generated from the odd unit intervals and coding decisions affecting the even unit intervals are based on the second phasor generated from the even unit intervals.

16. The method of claim 12, wherein:
obtaining the first data value comprises identifying rising edges of the data; and
obtaining the second data value comprises identifying falling edges of the data.

17. The method of claim 16, comprising:
obtaining a third data value based on odd unit intervals of the data bus and generating a third phasor based on the third data value; and
obtaining a fourth data value based on even unit intervals of the data bus and generating a fourth phasor based on the forth data value.

18. The method of claim 12, comprising identifying a bit sequence of the data and comparing the bit sequence to a specified bit sequence, wherein the first data value corresponds with rising edges of the data that are preceded by a first specified bit sequence; and the second data value corresponds with rising edges that are preceded by a second specified bit sequence different from the first specified bit sequence.

19. The method of claim 18, comprising:
obtaining a third data value based on falling edges of the data that are preceded by a third specified bit sequence; and
obtaining a fourth data value pulse based on falling edges of the data that are preceded by a fourth specified bit sequence.

20. The method of claim 12, wherein generating the first phasor comprises receiving a time-dependent unit interval time corresponding to the spread spectrum clocking signal.

21. The method of claim 12, comprising adjusting a magnitude of the first data value according to a corresponding pre-driver equalization control bit.

22. The method of claim 12, wherein the data bus is a Universal Serial Bus (USB) data bus.

23. An electronic device, comprising:
- logic to obtain a data value from data to be transmitted over a data bus;
- logic to alter a magnitude or phase of the data value to more accurately characterize a bus waveform corresponding to the data;
- logic to generate a phasor from the altered data value; and
- logic to use the phasor to reduce noise generated by the data bus.

24. The electronic device of claim 23, wherein the logic to alter a magnitude or phase of the data value comprises logic to alter the magnitude of the data value based on pre-equalization bits used to generate the bus waveform.

25. The electronic device of claim 23, wherein the logic to alter a magnitude or phase of the data value comprises logic to alter the phase of the data value according to a time-dependent unit interval time that corresponds with the spread spectrum clocking used to generate the bus waveform.

26. The electronic device of claim 23, wherein the logic to generate the phasor generates a unit interval phasor for each unit interval of the data bus, multiplies each unit interval phasor by an aging factor, and sums the unit interval phasors to generate the phasor.

27. The electronic device of claim 23, wherein the data bus is a Universal Serial Bus (USB) data bus.

28. A non-transitory, tangible, computer-readable medium, comprising instructions to direct a processor to:
- obtain a first data value based on data to be transmitted over a data bus;
- obtain a second data value based on the data to be transmitted over the data bus; and
- generate a first phasor from the first pulse sample and generating a second phasor from the second pulse sample;
- wherein a sum of the first phasor and the second phasor indicate, at least in part, the spectral content of the data to be transmitted over the data bus.

29. The non-transitory, tangible, computer-readable medium of claim 28, comprising instructions to direct the processor to obtain the first data value from rising edges of the data, and instructions to direct the processor to obtain the second data value from falling edges of the data.

30. The non-transitory, tangible, computer-readable medium of claim 28, comprising instructions to direct the processor to obtain the first data value from odd unit intervals of the bus, and instructions to direct the processor to obtain the second data value from even unit intervals of the bus.

* * * * *